US009256217B2

(12) United States Patent
Washington et al.

(10) Patent No.: US 9,256,217 B2
(45) Date of Patent: Feb. 9, 2016

(54) DYNAMICALLY ADAPTING TO CHANGES IN CONTROL SYSTEM TOPOLOGY

(75) Inventors: Rodney B. Washington, Raleigh, NC (US); Pierre Colle, Saint Martin d'Uriage (FR)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 848 days.

(21) Appl. No.: 13/419,123

(22) Filed: Mar. 13, 2012

(65) Prior Publication Data

US 2013/0131839 A1 May 23, 2013

(30) Foreign Application Priority Data

Nov. 22, 2011 (FR) ...................................... 11 60629

(51) Int. Cl.
*G06F 19/00* (2011.01)
*G05B 19/042* (2006.01)
*G05B 15/02* (2006.01)

(52) U.S. Cl.
CPC .............. *G05B 19/042* (2013.01); *G05B 15/02* (2013.01); *G05B 2219/2642* (2013.01); *G05B 2219/33273* (2013.01)

(58) Field of Classification Search
CPC ...................................................... G05B 19/02
USPC ............................................... 700/12, 19, 20
See application file for complete search history.

(56) References Cited

U.S. PATENT DOCUMENTS

| | | | | |
|---|---|---|---|---|
| 5,506,972 A | * | 4/1996 | Heath et al. | 710/113 |
| 6,026,461 A | * | 2/2000 | Baxter et al. | 710/244 |
| 6,630,889 B1 | * | 10/2003 | Morikawa | 340/12.27 |
| 7,020,701 B1 | * | 3/2006 | Gelvin et al. | 709/224 |
| 7,233,830 B1 | * | 6/2007 | Callaghan et al. | 700/9 |
| 7,454,565 B1 | | 11/2008 | Justiss et al. | |
| 8,335,607 B2 | * | 12/2012 | Gatten et al. | 701/31.1 |
| 8,775,681 B2 | * | 7/2014 | Menon et al. | 709/248 |
| 2003/0043790 A1 | * | 3/2003 | Gutierrez | 370/362 |
| 2003/0163598 A1 | * | 8/2003 | Wilson et al. | 709/318 |
| 2007/0219673 A1 | * | 9/2007 | Wang | 701/1 |
| 2013/0131837 A1 | * | 5/2013 | Washington et al. | 700/12 |
| 2013/0131839 A1 | * | 5/2013 | Washington et al. | 700/19 |

FOREIGN PATENT DOCUMENTS

WO   2010149185 A1   12/2010

OTHER PUBLICATIONS

"MiniCAN—a low-cost concept to integrate sensors and actuators into CAN networks", Trautmann et al, Technical University of Darmstadt, 1996.*

* cited by examiner

*Primary Examiner* — Michael D Masinick
(74) *Attorney, Agent, or Firm* — Locke Lord LLP

(57) ABSTRACT

An apparatus and method for adapting to changes in the control topology of a cooperative control system including a plurality of controllers are disclosed. The method is implemented by an actuator or sensor, and includes the steps of selecting one of the controllers as the master controller for one or more state variables of an actuator or sensor, detecting a change in the control topology of the cooperative control system, and reselecting a master controller for the one or more state variables responsive to the change in the control topology.

16 Claims, 16 Drawing Sheets

DYNAMICALLY ADAPTING TO CHANGES IN CONTROL SYSTEM TOPOLOGY

BACKGROUND

The present invention relates generally to control systems for process control and, more particularly, to an adaptive control system that can perform control functions in either a centralized or distributed manner depending on system topology.

A centralized control system can be easy to create and maintain because all of the control logic is at a single location. However, the processing requirements can be prohibitive if the central controller is expected to implement complex control algorithms, or to execute multiple control algorithms in parallel. Similarly, the bandwidth requirements to implement complex control algorithms may be prohibitive where data needs to be acquired from many remote sensors. Another drawback is that centralized control systems lack inherent robustness due to possible failure of the centralized controller. To ensure robustness, backup controllers may be required to ensure redundancy, which can make centralized control systems expensive to implement.

A distributed control system is a more complex control system in which multiple controllers share responsibility for certain control functions. In a distributed control system, the control functions may be divided among multiple controllers. One example of this type of control system is a residential heating system having multiple heating zones with heating and cooling elements. Each zone is independently controlled to maintain the temperature within the zone at a desired temperature set point. Each of the controllers is able to set the operating mode and desired temperature for each zone based on user input.

Distributed control systems can be scaled more easily than centralized control systems by adding additional controllers to extend the functionality of the control system. Another advantage of distributed control systems is their inherent redundancy. If one controller fails, the other controllers are still available to perform the control functions of the failed controller.

Typically, a control system is designed to use either centralized control or distributed control before the system components are installed. The choice is made by analyzing the advantages of each type of control given the desired application and system configuration. In order to change from one type of control to another would require the replacement of all of the controllers and many of the controlled components. Reconfiguration of the system would therefore require that operations be halted while the new controllers and other components are installed.

SUMMARY

The present invention provides a cooperative control system that dynamically adapts to changes in the control topology of the control system, thereby allowing controllers to be seamlessly added and removed without disruption of the control system functions. The ability to dynamically adapt to changes in the control topology enables the control system to be initially configured with relatively simple controllers that perform basic functions in a distributed manner, and to be later expanded to include advanced controllers that provide more centralized control. Similarly, when an advanced controller providing centralized control fails or is removed, the control system can revert back to distributed control without disruption.

Exemplary embodiments of the present invention comprise a method implemented by one or more actuators or sensors in the control system of adapting to changes in the control topology of the control system. One exemplary method comprises selecting one of the controllers as a master controller for one or more state variables of the actuator or sensor, detecting a change in the control topology of the cooperative control system, and reselecting a master controller for the one or more state variables responsive to the change in the control topology.

Other embodiments of the invention comprise an actuator or sensor that can adapt to changes in the control topology of a cooperative control system. One exemplary actuator or sensor comprises a communication interface for communication over a network with a plurality of controllers, and a control circuit for adapting to changes in control topology. The control circuit is configured to select one of the controllers as the master controller for one or more state variables of the actuator or sensor, detect a change in the control topology of the cooperative control system, and reselect a master controller for the one or more state variables responsive to the change in the control topology.

DETAILED DESCRIPTION

Figure 1:
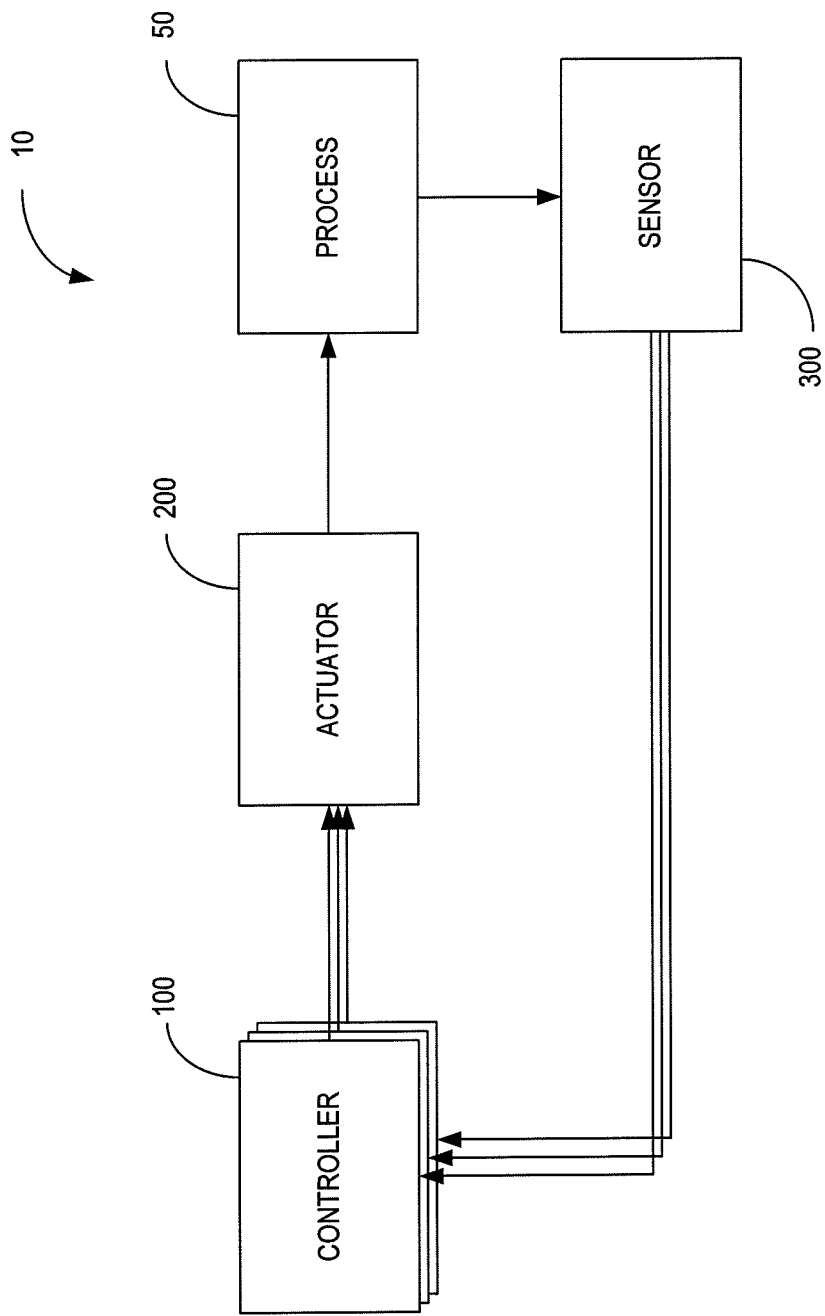
FIG. 1 illustrates a cooperative distributed control system with multiple controllers to control the functions of one or more actuators and sensors.

Referring now to the drawings, FIG. 1 schematically illustrates a cooperative distributed control system indicated generally by the numeral 10. The cooperative distributed control system 10 includes a plurality of controllers 100, a plurality of actuators 200, and a plurality of sensors 300. The controllers 100 share responsibility for controlling a process 50. The sensors 300 provide feedback to the controllers 100 regarding the current state of the process 50. In response to the feedback from the sensors 300, the controllers 100 can generate and send control commands to one or more of the actuators 200 to implement a control algorithm. Typically, the commands are used to set the value of a state variable of the actuators 200 and sensors 300.

Figure 2A:
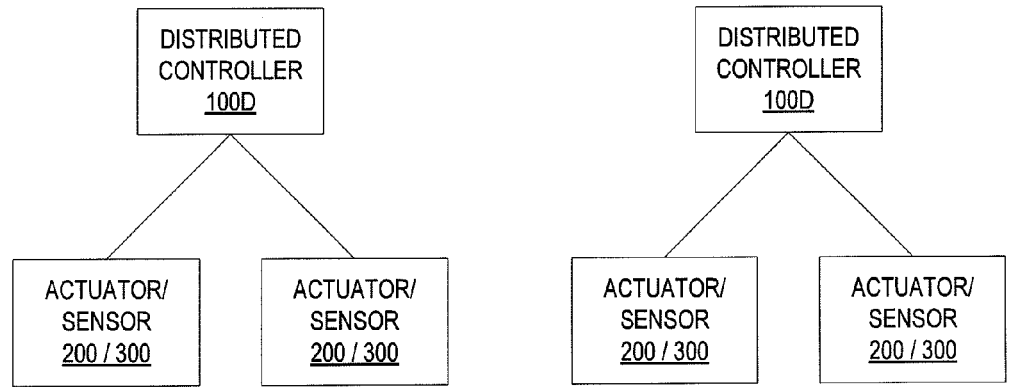
FIGS. 2A and 2B illustrate a change in the control topology of the control system between distributed control and centralized control.
Figure 2B:
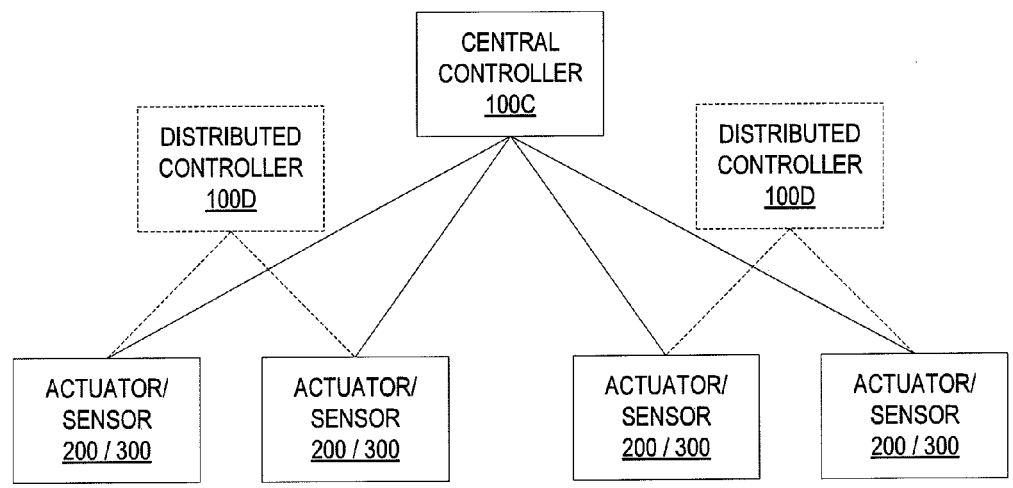

Referring to FIGS. 2A and 2B, the controllers 100 within the control system 10 may comprise a plurality of distributed controllers 100D, a central controller 100C, or a mixture of distributed controllers 100D and central controllers 100C. The letter suffix is used to indicate the type of controller 100, where the suffix "D" indicates a distributed controller 100 and the suffix "C" indicates a central controller 100. The reference numeral 100 without a letter suffix refers to controllers generically. The distributed controllers 100D may be designed to implement relatively simple control algorithms based on limited data. The central controllers 100C implement more complex control algorithms than a distributed controller and have access to a broader range of data. In general, it is desirable to give control over state variables to the more intelligent controller.

The control topology of the control system 10 may change over time. As used herein, the term "control topology" refers to the number and types of controllers within the control system 10. Controllers 100 can be added or removed to the control system 10 without stopping operations to reconfigure the control system 10. Thus, the control system 10 may be initially configured with a plurality of distributed controllers 100D that provide basic control functions for different groups of actuators 200 and sensors 300. A central controller 100C may be added later to provide more advanced control functions.

As described hereinafter in greater detail, the actuators 200 or sensors 300 dynamically adapt to changes in the control topology without disruption of the control functions. When a central controller 100C is added to a control system 100 with distributed controllers 100D, the actuators 200 and sensors 300 will recognize the change in the control topology and dynamically adapt to the change. The control functions performed by the distributed controllers 100D will be "taken over" by the central controller 100C so that the central controller 100C controls the actuators 200 and sensors 300 in each group. Similarly, the actuators 200 and sensors 300 can dynamically adapt to the loss of a central controller 100C. In this case, control functions performed by the central controller 100C will revert back to the distributed controllers 100D when the central controller 100C is removed or malfunctions. Thus, the type of control, centralized or distributed, is not fixed at the time of installation.

FIG. 2A illustrates a control system with a plurality of distributed controllers 100D performing distributed control for different groups of actuators 200 and sensors 300. The notation "Actuator/Sensor" is used to refer to a device which could correspond to either of an actuator 200 or a sensor 300.

FIG. 2B shows the addition of a central controller 100C to the same control system. When the central controller 100C is added, it may assume control over the actuators 200 and sensors 300 previously supervised by the distributed controllers 100D.

Figure 3:
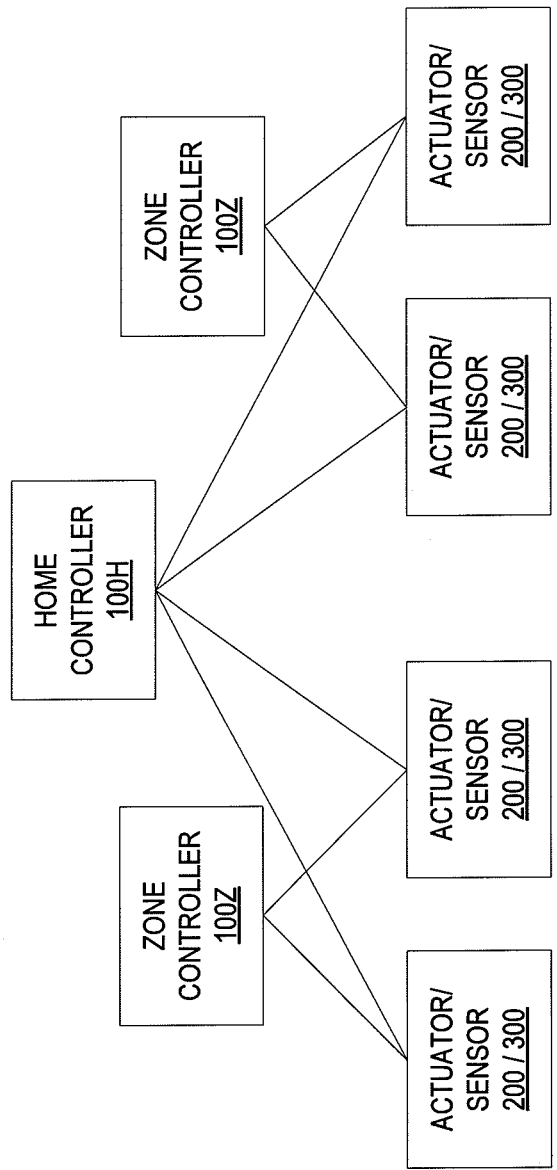
FIG. 3 illustrates a control system with a mixture of distributed and centralized controllers.

In FIG. 3, for example, the control system 10 may control a residential HVAC system with multiple zones. The control system 10 may be initially configured with a plurality of zone controllers 100Z that provide distributed control for respective zones. In this case, each zone controller 100Z controls the actuators 200 and sensors 300 in its respective zone. For example, each zone controllers 100Z may control the temperature set point and mode (heating, cooling, or fan) in its respective zone. A home controller 100H may be added later to provide more advanced control functions for two or more zones. The home controller 100H may "take over" control of the actuators 200 and sensors 300 previously controlled by the zone controllers 100Z. Thus, the home controller 100H may command the temperature set point and mode for each zone. If the home controller 100H fails, control over the temperature set point and mode will revert back to the zone controllers 100Z.

A control system 10 with independent control variables may employ a mixture of centralized and distributed control. Some independent variables within the control system 10 may be controlled by a central controller, while other variables are controlled by distributed controllers. FIG. 3 illustrates a control system 10 for a HVAC system using a combination of centralized and distributed control. In this example, a home controller 100H controls the temperature set point for each zone, while zone controllers 100Z control the mode.

Figure 4:
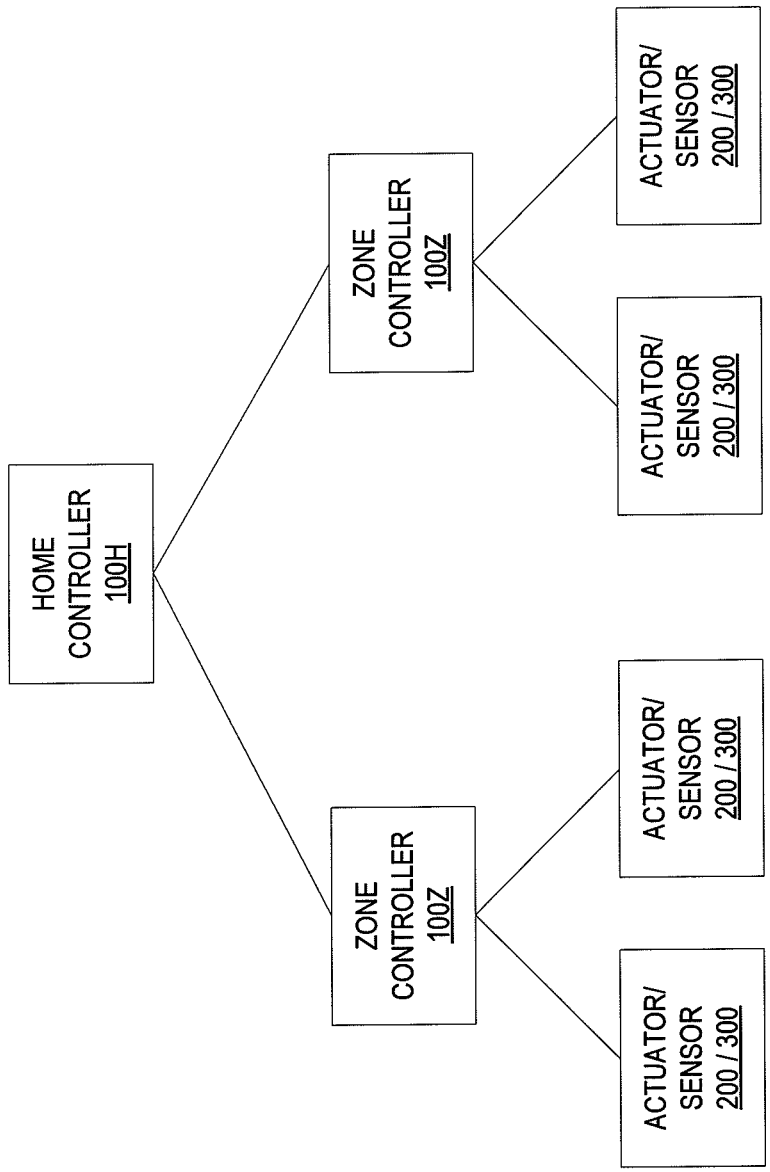
FIG. 4 illustrates a control system using a hierarchical control scheme.

Central controllers 100C and distributed controllers 100D may also be combined to provide hierarchical control. In a hierarchical control system, a central controller 100C can command a distributed control to set limits or ranges on control variables subject to the control of the distributed controller 100. FIG. 4 illustrates a control system 10 for a HVAC system using a hierarchical control scheme. In this example, zone controllers 100Z control the actuators 200 and sensors 300 in respective zones. A central home controller 100H in turn set limits or ranges for the control variables supervised by the zone controllers 100Z. For example, each zone controller 100Z may control the temperature set point and mode within its respective zone. The home controller 100H may set limits on the acceptable range for the temperature set point. That is, the home controller 100H may set a maximum and/or minimum value for the temperature set point. In operation, the zone controllers 100Z determine a desired temperature set point within the range specified by the home controller 100H.

In many control topologies, an actuator 200 or sensor 300 will receive commands from multiple controllers 100. The control system 10 implements cooperative control techniques that allow the system to adapt to changes in the control topology without having to stop and reconfigure the controllers 100. Rules are provided for command arbitration and data synchronization. The command arbitration rules determine which controllers are allowed to exercise control over which state variables. The data synchronization rules make sure that the state variables of the actuators 200 or sensors 300 remain synchronized.

Command Arbitration

Certain embodiments of the present invention perform command arbitration based on controller priority. The controllers 100 are assigned priority levels based on the controller capabilities. Thus, a central controller 100C that performs advanced control functions is assigned a priority level higher than a distributed controller 100D that handles more basic control functions. Controllers 100 with different priority levels may attempt to exercise control over a state variable for an actuator 200 or sensor 300. Command arbitration is based on the relative priorities of the controllers 100.

The term "control set" will be used herein to refer to the set of controllers 100 that actively control the same actuator 200 or sensor 300. The actuator 200 or sensor 300 being controlled designates a controller 100 in its control set with the highest priority as its master controller for command arbitration. The master controller selected for command arbitration is hereinafter referred to as the "arbitration master controller." If multiple controllers 100 have the same priority, the arbitration master controller is the first controller 100 to command the actuator 200 or sensor 300. The arbitration master controller may comprise either a distributed controller 100D, or a central controller 100C. Controllers 100 with a priority level lower than the arbitration master controller are referred to herein as subordinate controllers. Controllers 100 having the same priority as the master controller are referred to as peer controllers. The term "originating controller" will be used to refer to a controller that sends a command. Any controller 100 can be an originating controller.

The arbitration master controller does not need to have direct control over the subordinate controllers, but instead controls certain state variables of an actuator 200 or sensor 300. If an actuator 200 or sensor 300 receives a command from a subordinate controller, the command is forwarded to the current arbitration master controller without action by the actuator 200 or sensor 300. The arbitration master controller may reissue the command with or without modifications, or may ignore the command. A command from a peer controller is executed using last command arbitration to resolve contention.

The actuators 200 and sensors 300 are designed to dynamically select a new arbitration master controller responsive to changes in control topology. Reselection of an arbitration master controller may occur when a new controller 100 with high priority is added to the control system 10. The new controller 100 will appear to the actuators 200 and sensors 300 when it sends commands. When an actuator 200 or sensor 300 receives a command from a new controller 100 with a priority higher than the current arbitration master controller, the new controller 100 is designated as the new arbitration master controller and the old arbitration master controller becomes a subordinate controller.

If the current arbitration master controller for an actuator 200 or sensor 300 is removed or becomes non-responsive, the actuator 200 or sensor 300 will select a new arbitration master controller from its control set. After the removal of the current arbitration master controller, the actuator 200 or sensor 300 will continue to receive control commands from the remaining controllers 100. When the actuator 200 or sensor 300 receives a command after the arbitration master controller is removed or becomes non-responsive, the actuator 200 or sensor 300 can designate the originating controller as the new arbitration master controller. If the actuator 200 or sensor 300 later receives a control command from a controller 100 in its control set with a higher priority, the originating controller with the higher priority will be designated as the new arbitration master controller and the old arbitration master controller becomes a subordinate controller. Eventually, the controller 100 in the control set with the highest priority will be selected as the arbitration master controller.

Having the actuators 200 and sensors 300 perform arbitration based on controller priority allows the system to dynamically adapt to changes in control topology without intervention of a technician to reconfigure the control system 10. Because a central controller 100C will typically have a higher priority than a distributed controller 100D, the central controller 100C will be designated as the arbitration master controller and "take over" control of the state variables for an actuator 200 or sensor 300 when it sends a command to the actuator 200 or sensor 300. Commands from the lower priority distributed controllers 100D will be forwarded by the actuators 200 or sensors 300 to the higher priority central controller 100C. Control can revert back to the distributed controllers 100D when the central controller 100 fails or is no longer present.

In the control system 10 described above for an HVAC system, home controller 100H can perform centralized control by sending commands to actuators 200 and sensors 300 in different zones. In the absence of the home controller 100C, the zone controllers 100Z can perform distributed control of the actuators 200 and sensors 300 in their respective zones.

Figure 5:
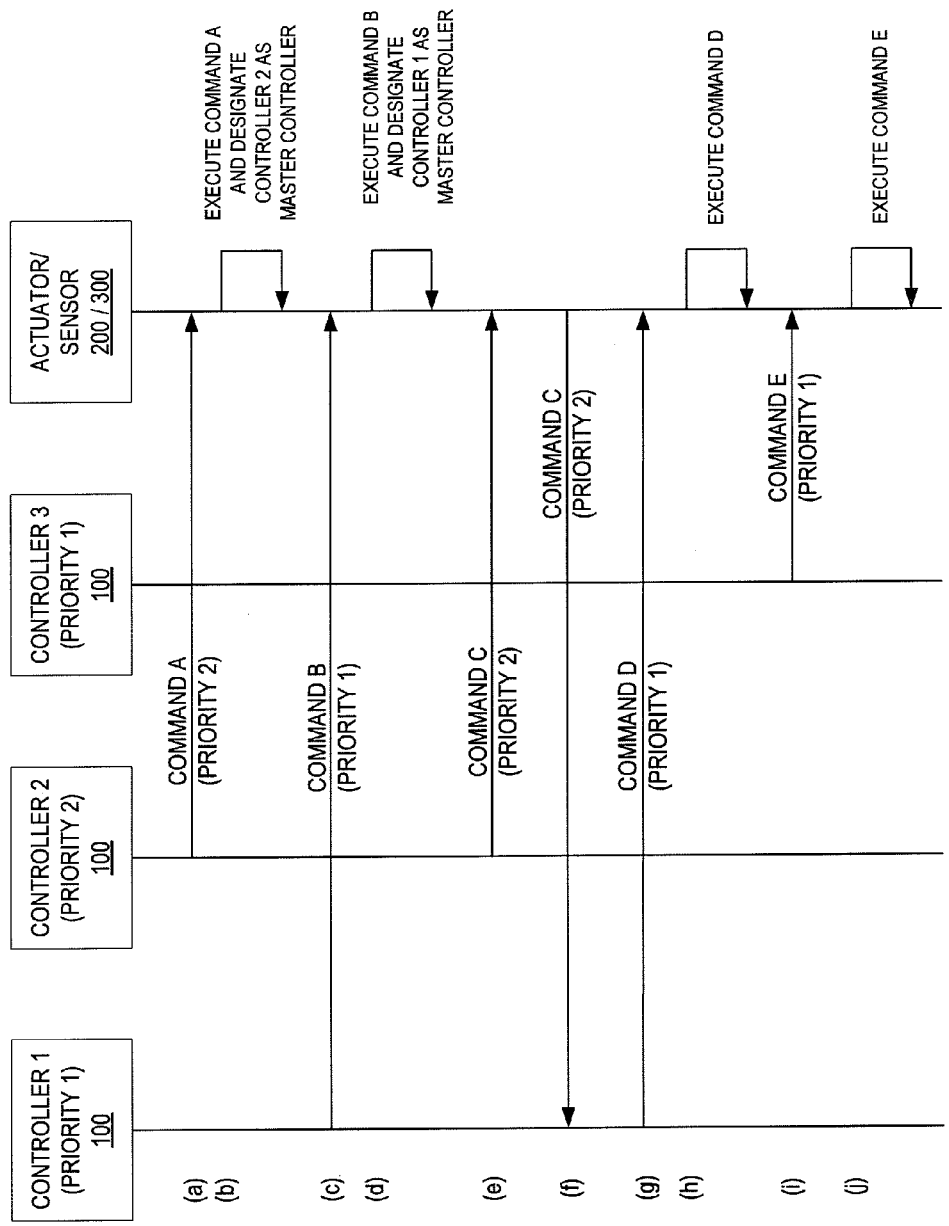
FIG. 5 illustrates an exemplary command sequence illustrating prioritized controller arbitration.

FIG. 5 illustrates an exemplary arbitration sequence in a control system 10 implementing the prioritized controller arbitration scheme described above. In this example, there are 3 controllers denominated as Controller 1, Controller 2 and Controller 3. Controllers 1 and 3 have a priority level of 1, while Controller 2 has a priority level of 2. In this example, the priority level of 1 is the highest priority level. Initially, Controller 2 (priority level 2) sends a command ("Command A") to an actuator 200 or sensor 300 (step a). Because Controller 2 is the first controller 100 to issue a command to the actuator 200 or sensor 300, the actuator 200 of sensor 300 designates Controller 2 as the arbitration master controller and executes the command (step b). Controller 1 (priority level 1) subsequently sends another command ("Command B") to the actuator 200 or sensor 300 (step c). Because Controller 1 has a higher priority level than Controller 2, the actuator 200 or sensor 300 designates Controller 1 as the new arbitration master controller and the command is immediately executed (step d). Later, when Controller 2 sends a command ("Command C") to the actuator 200 or sensor 300 (step e), the command is forwarded to Controller 1, the arbitration master controller, without execution (step f).

In some embodiments, Controller 1 may send an acknowledgement of the command to the actuator 200 or sensor 300 to confirm its receipt of the command. Controller 1 can re-issue the command with or without modification, or ignore the command. In the example shown in FIG. 5, Controller 1 modifies the command and then sends the modified command ("Command D") to the actuator 200 or sensor 300 (step g). The modified command is then executed by the actuator 200 or sensor 300 (step h). Later, Controller 3 sends a command ("Command E") to the sensor 300 (step i). Controller 3 has the same level of priority as Controller 1, which is serving as the current arbitration master controller. In this case, the actuator 200 or sensor 300 immediately executes the command from Controller 3 using last command arbitration to resolve contention (step j). Controller 1 remains the arbitration master controller.

Figure 6:
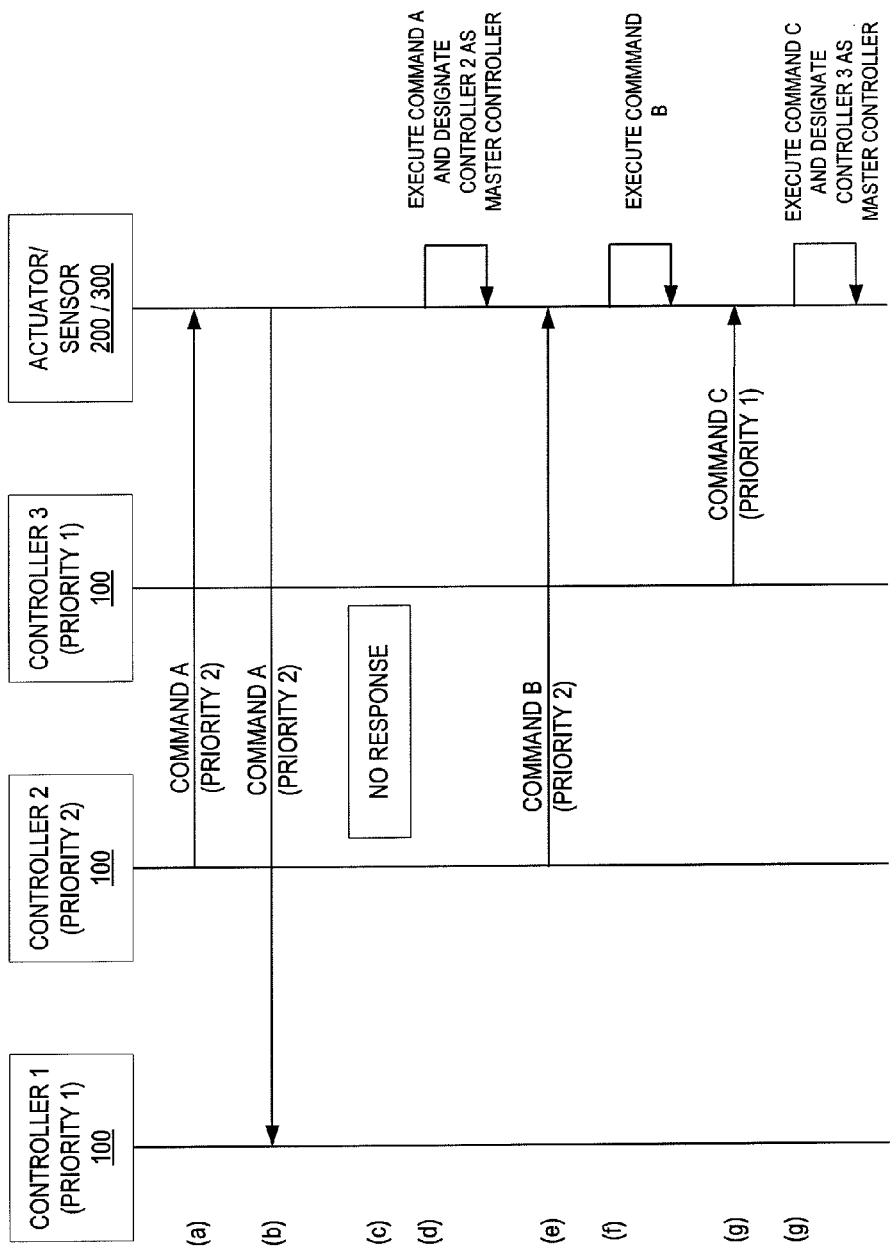
FIG. 6 illustrates an exemplary command sequence illustrating master controller selection for prioritized command arbitration.

FIG. 6 illustrates an exemplary control sequence showing reselection of an arbitration master controller. The sequence starts with Controller 1 as the current master controller. Controller 2, with a priority level lower than Controller 1, sends a command ("Command A") to the actuator 200 or sensor 300 (step a). Because Controller 2 has a priority level lower than Controller 1, the actuator 200 or sensor 300 forwards the command to Controller 1 (step b). In this example, Controller 1 fails to acknowledge the command or otherwise respond (step c). The failure to respond may indicate that Controller 1 has been removed, or is not functioning. When Controller 1 fails to respond to the actuator 200 or sensor 300 within a predefined period of time, the actuator 200 or sensor 300 designates Controller 2 as the new arbitration master controller (step d) and executes the command. When Controller 2 sends a new command ("Command B") (step e), the actuator 200 or sensor 300 immediately executes the command (step f). Later, Controller 3 sends a command ("Command C") to the actuator 200 or sensor 300 (step g). Because Controller 3 has a higher priority level than Controller 2, the actuator 200 or sensor 300 designates Controller 3 as the new arbitration master controller and immediately executes the command.

Figure 7:
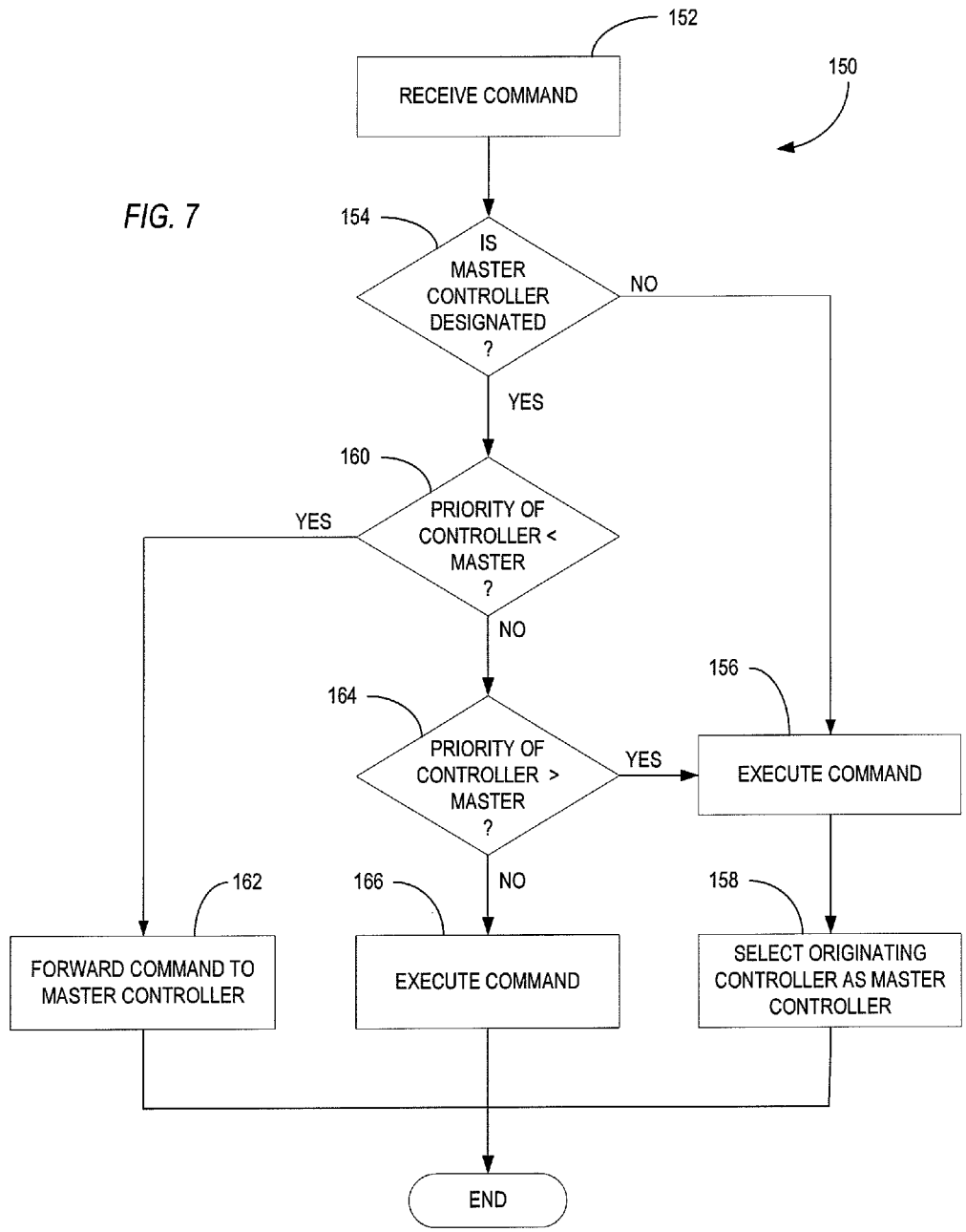
FIG. 7 illustrates an exemplary prioritized controller arbitration method for a cooperative distributed control system.

FIG. 7 illustrates an exemplary command arbitration procedure 150 for the control system 10 where multiple controllers exercise control in a coordinated manner over the same actuator 200 or sensor 300. The command arbitration procedure 150 is performed by an actuator 200 or sensor 300 that is being controlled by multiple controllers 100. The procedure 150 begins when the actuator 200 or sensor 300 receives a command from a controller 100 within its control set (block 152). The actuator or sensor 300 initially determines whether an arbitration master controller has been designated for the state variable that is the object of the command (block 154). As previously noted, different arbitration master controllers can be designated for different state variables of the same actuator 200 or sensor 300. If no arbitration master controller has been designated, the actuator 200 or sensor 300 executes the command (block 156) and designates the controller 100 from which the command originated (i.e. the "originating controller") as the arbitration master controller (block 158). If an arbitration master controller has been designated, the actuator 200 or sensor 300 compares the priority level of the originating controller to the priority level of the arbitration master controller (blocks 160, 164). If the priority level of the originating controller is less than the arbitration master controller (block 160), the actuator 200 or sensor 300 forwards the command to the arbitration master controller (block 162). In the case where the priority level of the originating controller is greater than the arbitration master controller (block 164), the actuator 200 or sensor 300 executes the command (block 156) and designates the originating controller as the new arbitration master controller (block 158). If the priority level of the originating controller is the same as the arbitration master controller, the actuator 200 or sensor 300 executes the command (block 166).

Data Synchronization

Each controller 100 needs to know the state of the actuator 200 or sensor 300 it controls in order to perform the required calculations for its control functions. The controller 100 also needs to be able to set the value of state variables for the actuators 200 and sensors 300. As an example, a controller 100 in a residential heating system needs to know the current temperature set point in a zone in order to determine whether heating or cooling should be applied. Because multiple controllers 100 may be able to change a specific state variable of the actuator 200 or sensor 300, no controller 100 can assume the current state from the last command it sent to the actuator 200 or sensor 300. Each actuator 200 or sensor 300 "owns" its current state, and the controller 100 reads the state of the actuator 200 or sensor 300 each time the controller 100 needs the data to perform a control action.

The actuators 200 and sensors 300 may be logically grouped together because they share a common state, such as an operating mode or set point. As an example, in a residential HVAC system, the heating and cooling elements within a zone should have the same temperature set point. An inconsistency can cause control system errors and ambiguous control actions. For example, if the heating elements have a higher temperature set point than the cooling elements, the control system 10 may try to heat and cool the zone simultaneously, with wasteful and ambiguous results. Thus, inconsistency can cause devices within a logical group to work against each other.

An inconsistent state for actuators 200 and sensors 300 within a group can be caused by a communication failure, a device failure, or interlaced commands from multiple controllers to members of the logical group. Because there are multiple controllers 100, more than one controller 100 could try to change the state of an actuator 200 or sensor 300 at the same time, causing an inconsistency within the group. Inconsistent states can also occur if the number of actuators 200 or sensors 300 within a group change. An actuator 200 or sensor 300 within a group may be temporarily removed before a new state command is set by a controller 100 and then added back after the command has already been sent. An example of this scenario would be when an actuator 200 or sensor 300 is removed to change a battery. Also, a newly-added actuator 200 or sensor 300 may have a different state than other actuators 200 and sensors 300 within a logical group.

Figure 8:
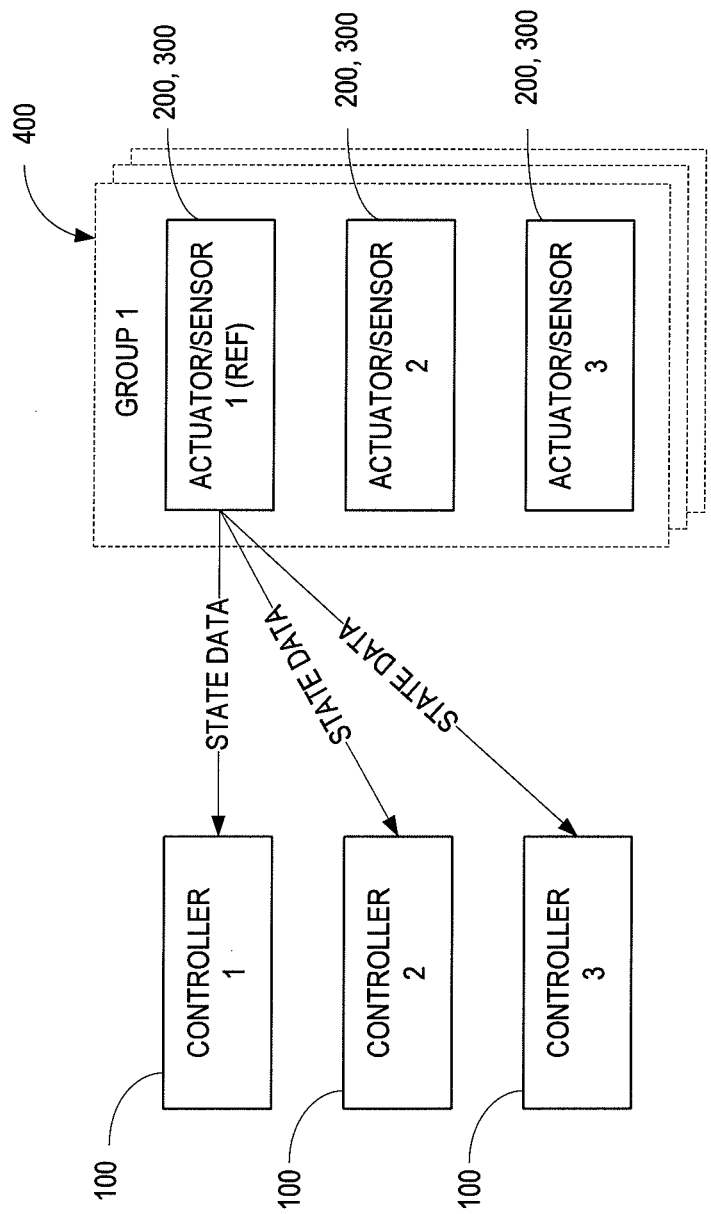
FIG. 8 illustrates a reference device for a logical group of actuators and sensors.

In some embodiments, one of the actuators 200 or sensors 300 within a logical group may serve as a reference device for a logical group for a specific state variable. FIG. 8 illustrates a logical group 400 including Actuator/Sensor 1, Actuator/Sensor 2, and Actuator/Sensor 3. Actuator/Sensor 1 serves as a reference device (and using the notation described above corresponds to either an actuator or a sensor). The state of each actuator 200 and sensor 300 within the logical group 400 is considered to be the same as the state of the reference device.

Before taking a control action, the controllers 100 read the current value of the state variable from the reference device. The state of each actuator 200 and sensor 300 within the logical group 400 is considered to be the same as the state of the reference device. Thus, the assignment of a reference device for the logical group avoids the need to read the value of the state variable from each actuator 200 and sensor 300 within the logical group, thus reducing signaling overhead. When updating a state variable, the controller 100 sends a command to update the state variable to every actuator 200 and sensor 300 in the logical group to maintain data consistency.

The reference device for each logical group 400 must be uniquely identifiable and known to all of the controllers 100. Because each component in a control system 10 must have a unique network address, the actuator 200 or sensor 300 with the lowest network address can be chosen to serve as the reference device for the logical group 400.

Figure 9:
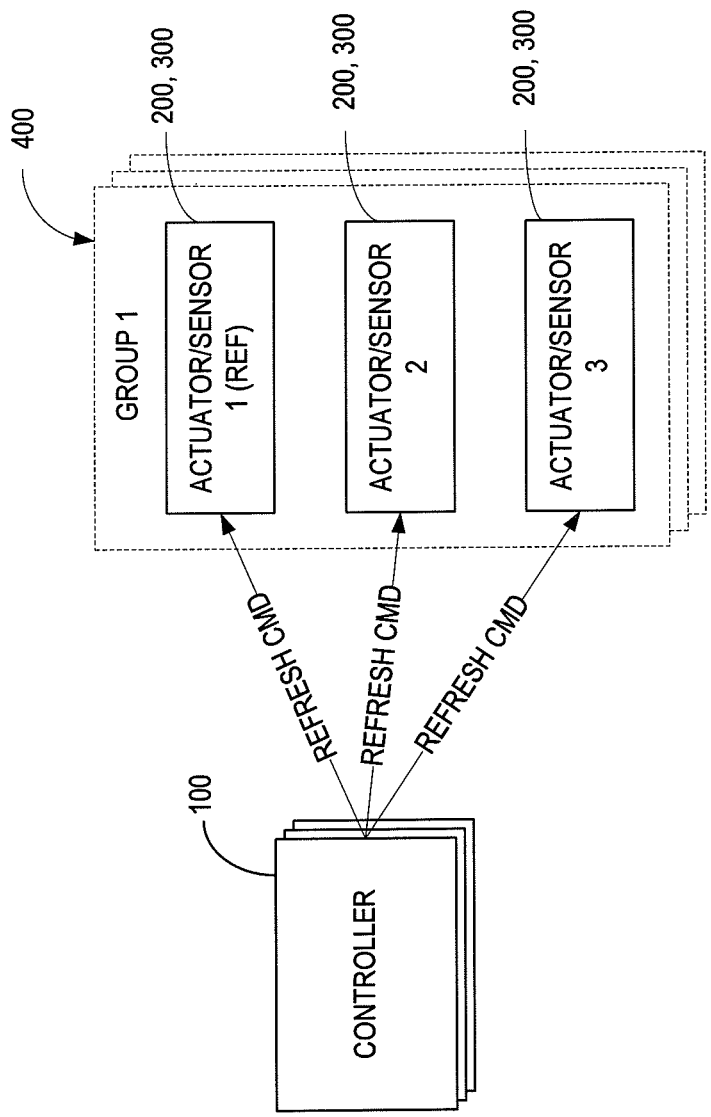
FIG. 9 illustrates a refresh master controller for a logical group of actuators and sensors that is responsible for data synchronization.

For purposes of data synchronization, one of the controllers 100 is designated to serve as a refresh master controller for one or more state variables. The refresh master controller periodically refreshes or rewrites the current state of each actuator 200 and sensor 300 within a logical group for which it is responsible to maintain data synchronization. FIG. 9 illustrates a refresh master controller performing a refresh operation for logical group 400. Refreshing the state of each actuator 200 and sensor 300 within the logical group 400 resolves consistency problems that may occur during normal operation. For example, a newly added actuator 200 or sensor 300 may have a different state than other actuators 200 and sensors 300 within the same logical group 400. Also, an actuator 200 or sensor 300 within a logical group 400 that is temporarily removed, e.g., to change a battery, may have a different state than other group members due to a change of state while the actuator 200 or sensor 300 was offline. In these cases, the inconsistency is resolved when the refresh master controller refreshes the state of the actuators 200 or sensors 300 within the logical group 400.

The refresh master controller will typically be the same as the arbitration master controller; however, there are deployments where the arbitration master controller and the refresh master controller may be different.

The actuators 200 and sensors 300 within a logical group 400 may have multiple independent state variables. A different refresh master controller may be selected for each independent state variable. Also, different state variables may have different reference devices. As an example, in a residential HVAC system, the actuators 200 and sensors 300 within a cooling or heating zone may select one refresh master controller for the mode (e.g., heating or cooling), and a different refresh master controller for the temperature set point. In one exemplary embodiment, the refresh master controller is the last controller 100 to update the state for the logical group 400. When a controller 100 updates a state variable, a "Set State" command is sent to each actuator 200 and sensor 300 in the logical group 400. The Set State command specifies a state variable and a new value for the state variable. For each state variable, the reference device for that variable remembers the identity of the controller 100 that was the last-to-command. Before performing a refresh operation, a controller 100 must verify that it is the refresh master controller. Thus, the reference device arbitrates contention between the different controllers 100 and determines which controller 100 is the refresh master controller.

Figure 10:
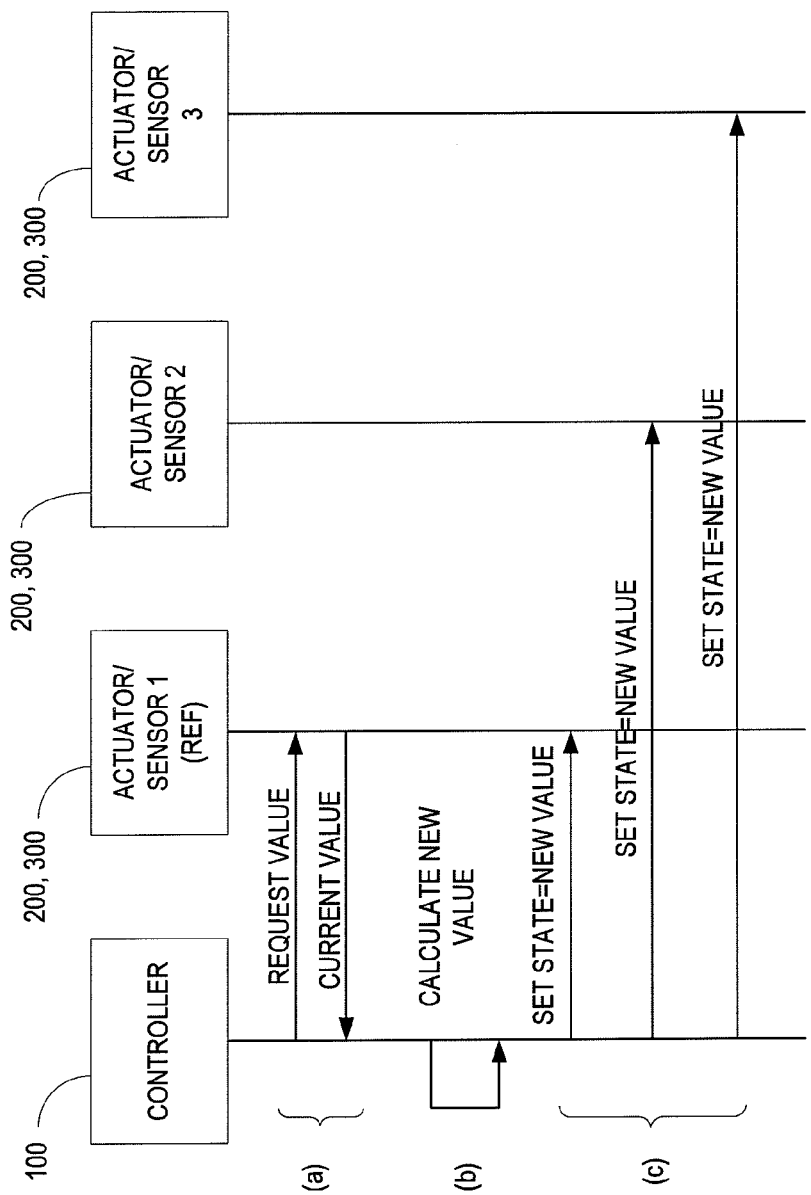
FIG. 10 illustrates an exemplary signaling flow for updating a state variable for a logical group of actuators and sensors.

FIG. 10 illustrates an update procedure performed by a controller 100 to update a state variable for a logical group. Before updating the state variable, the controller 100 needs to determine the current value of the state variable for the logical group 400. As previously noted, the controller 100 fetches the current value of the state variable from the reference device for the logical group (step a). More particularly, the controller 100 sends a request to the actuator 200 or sensor 300. In response to the request, the actuator 200 or sensor 300 returns the current value. The controller 100 then calculates the new value of the state variable (step b). To maintain data synchronization, the controller 100 sends a Set State command to each member of the logical groups (step c). The Set State command indicates the state variable that is the target of the command and the new value of the state variable. Additional information, such as the controller identification may be included in the Set State command. When the Set State command is received by an actuator 200 or sensor 300, the actuator 200 or sensor 300 sets the value of the state variable to the value specified by the Set State command.

Figure 11:
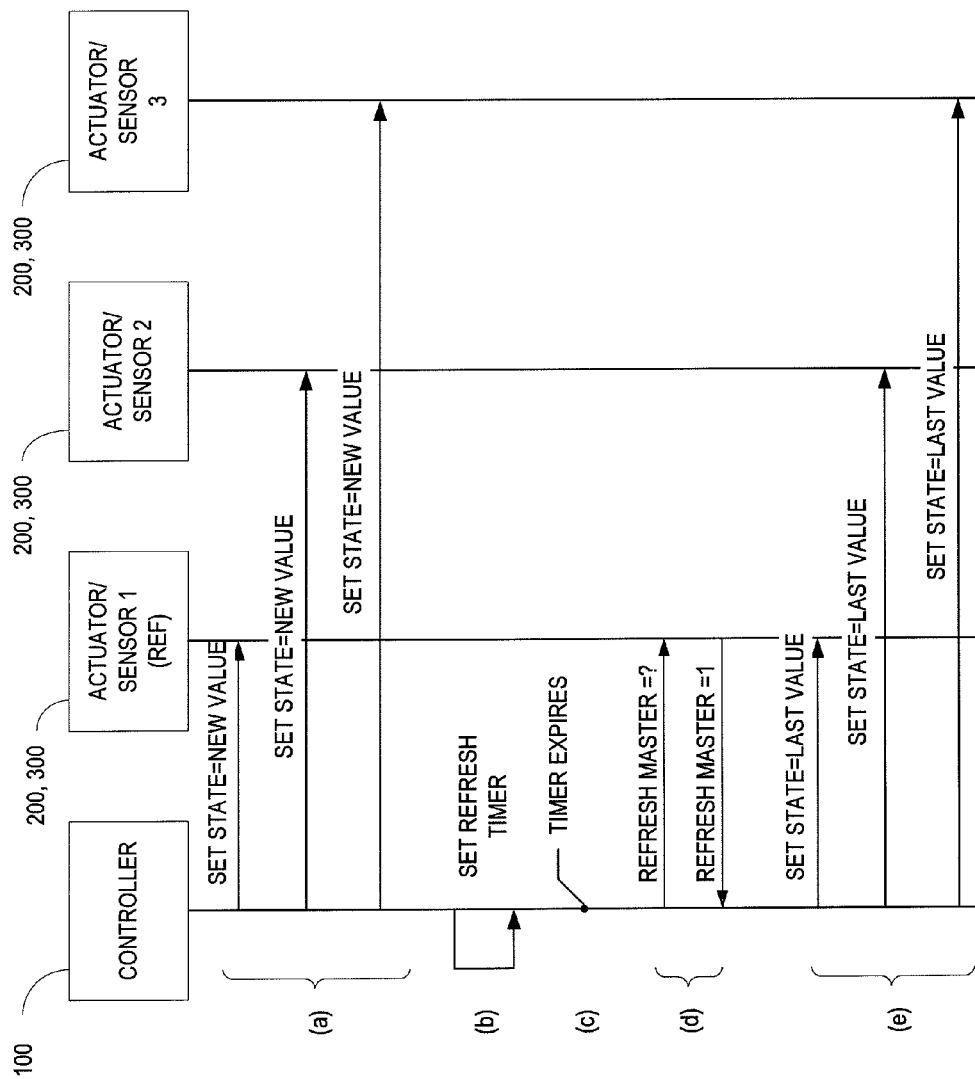
FIG. 11 illustrates an exemplary signaling flow for refreshing a state variable for a logical group of actuators and sensors.

FIG. 11 illustrates an exemplary data refresh sequence. Controller 1 sends a Set State command to each of the actuators 200 and sensors 300 in a logical group 400 to change a state variable (step a). The Actuator/Sensor 1 serves as the reference device for the logical group 400. The Actuator/Sensor 1 remembers the identity of controller 1. After sending the command, Controller 1 sets a refresh timer (step b). When the refresh timer expires (step c), Controller 1 queries the reference device to determine if it is still the refresh master for the logical group 400 (step d). This query is needed because another controller 100 may have updated the state variable after Controller 1. When the reference device confirms that Controller 1 is the refresh master (e.g. returns a value of REFRESH MASTER=1), Controller 1 sends commands to each Actuator/Sensor 1, 2, 3 in the logical group 400 to set the value of the state variable to the value specified by the last command sent by Controller 1 (step e).

The data synchronization techniques as herein described enable data synchronization of actuators 200 and sensors 300 in a logical group 400 without direct interaction between the controllers 100. By designating one of the actuators 200 or sensors 300 to serve as a reference device, signaling overhead, congestion, and latency are reduced. The control system 10 can be easily scaled by adding or removing actuators 200, sensors 300, or both, without manual reconfiguration. Additionally, controllers 100 can also be easily added and removed to the system 10. The addition or removal of an actuator 200 or sensor 300 may result in reselection of the reference device for a logical group 400 by the controllers 100.

Figure 12:
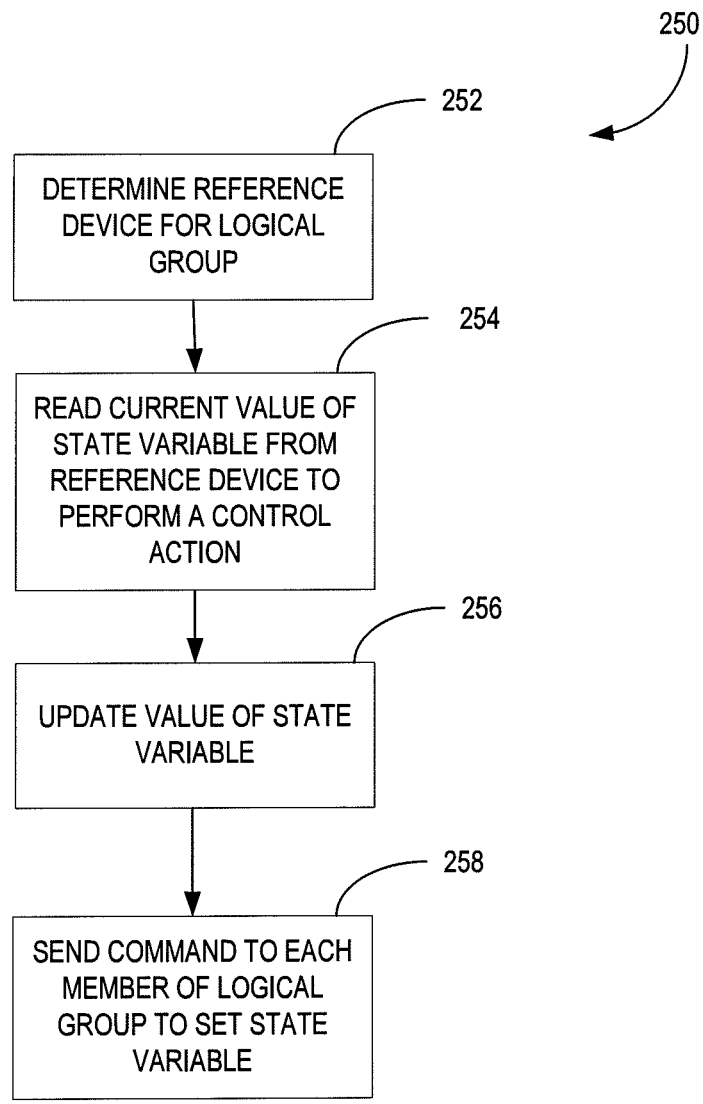
FIG. 12 illustrates an exemplary data synchronization method for a control system where multiple controllers exercise control in a coordinated manner over a logical group of actuators and sensors.

FIG. 12 illustrates an exemplary method 250 executed by a controller 100 to update a state variable for a logical group 400 of actuators 200 and sensors 300. To start the procedure, the controller 100 determines the actuator 200 or sensor 300 that is serving as the reference device for a logical group 400 (block 252). As previously noted, in one example the reference device may comprise the actuator 200 or sensor 300 with the lowest network address. The controller 100 then reads the current value of the state variable from the reference device (block 254), which may be used to perform a control action. The controller 100 may then calculate a new value for the state variable (block 256). When the new value is determined, the controller 100 sends a Set State command to each actuator 200 and sensor 300 in the logical group to update the state variable (block 258).

Figure 13:
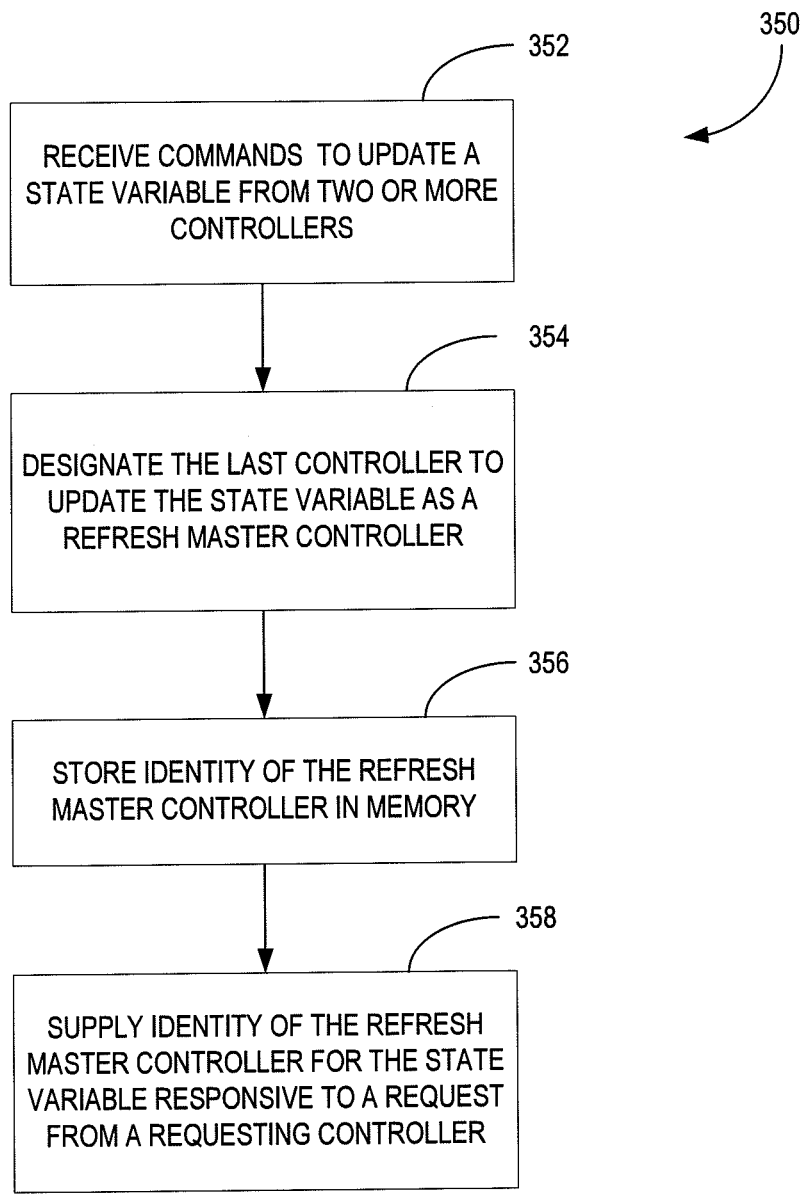
FIG. 13 illustrates an exemplary method of selecting a refresh master controller responsible for data synchronization.

FIG. 13 illustrates an exemplary method 350 implemented by an actuator 200 or sensor 300 for selecting the refresh master controller. The actuator 200 or sensor 300 receives commands at different times to update a state variable from a plurality of controllers 100 (block 352). The actuator 200 or sensor 300 designates the last controller 100 to update the state variable as the refresh master controller (block 354). The actuator 200 or sensor 300 stores the identity of the refresh master controller in memory of the actuator 200 or sensor 300 (block 356). Thereafter, the actuator 200 or sensor 300 supplies the identity of the refresh master controller to a requesting controller 100 that sends a request to the actuator 200 or sensor 300 for the identity of the refresh master controller (block 358).

Figure 14:
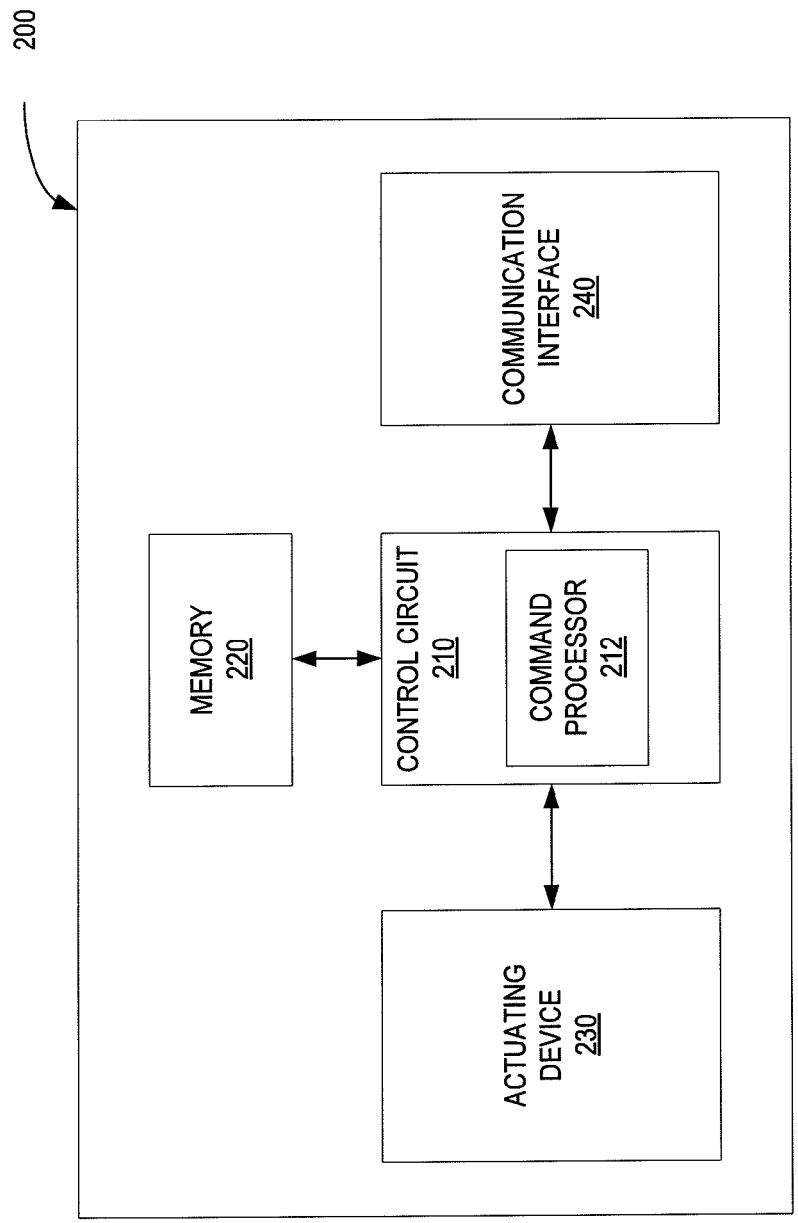
FIG. 14 illustrates an exemplary actuator configured to implement the prioritized controller arbitration method of FIG. 13.

FIG. 14 illustrates the main functional elements of an actuator 200 for performing cooperative control, arbitration, and data synchronization. The actuator 200 comprises a control circuit 210, memory 220, an actuating device 230, and a communication interface 240. The control circuit 210 controls the operation of the actuator 200 as previously described. The control circuit 210 may be implemented by one or more processors, hardware circuits, firmware, or a combination thereof. The control circuit 210 includes a command processor 212 to process commands received from the controllers 100. The command processor 212 is configured to receive commands from the controllers 100 via the communication interface 240, select one of the controllers 100 as the master controller for each of its state variables, forward the commands from subordinate controllers to the master controller via the communication interface 240, and execute commands from its peer controller or master controller.

Memory 220 stores program instructions and data needed by the control circuit 210 to perform its functions. Memory 220 also stores the current values of the state variables of the actuator 200. Memory 220 may, for example, comprise a non-volatile memory device such as an electrically erasable programmable read-only memory (EEPROM), flash memory, or magnetoresistive random access memory (MRAM). A volatile memory device, such a random access memory (RAM), may also be used to store temporary data.

The actuating device 230 comprises a control device that is used to control a process. As one example, the actuating device 230 may comprise an on/off switch to control the power to a component in a process. In a residential heating system, an on/off switch can be used to control the supply of power to heating elements, fans, or other devices in the process, for example. In this case, the state of the switch may comprise one of the state variables that is controlled by the controllers 100.

The communication interface 240 provides a connection to a local area network (LAN) and enables the actuator 200 to communicate with the controllers 100 in the control system 10. If the LAN comprises a wireline network, the communication interface may comprise an Ethernet interface. Alternatively, the communication interface 240 may comprise a WiFi interface, BLUETOOTH interface, ZIGBEE interface, or other wireless radio interface to connect to a wireless access point (WAP) in the LAN.

Figure 15:
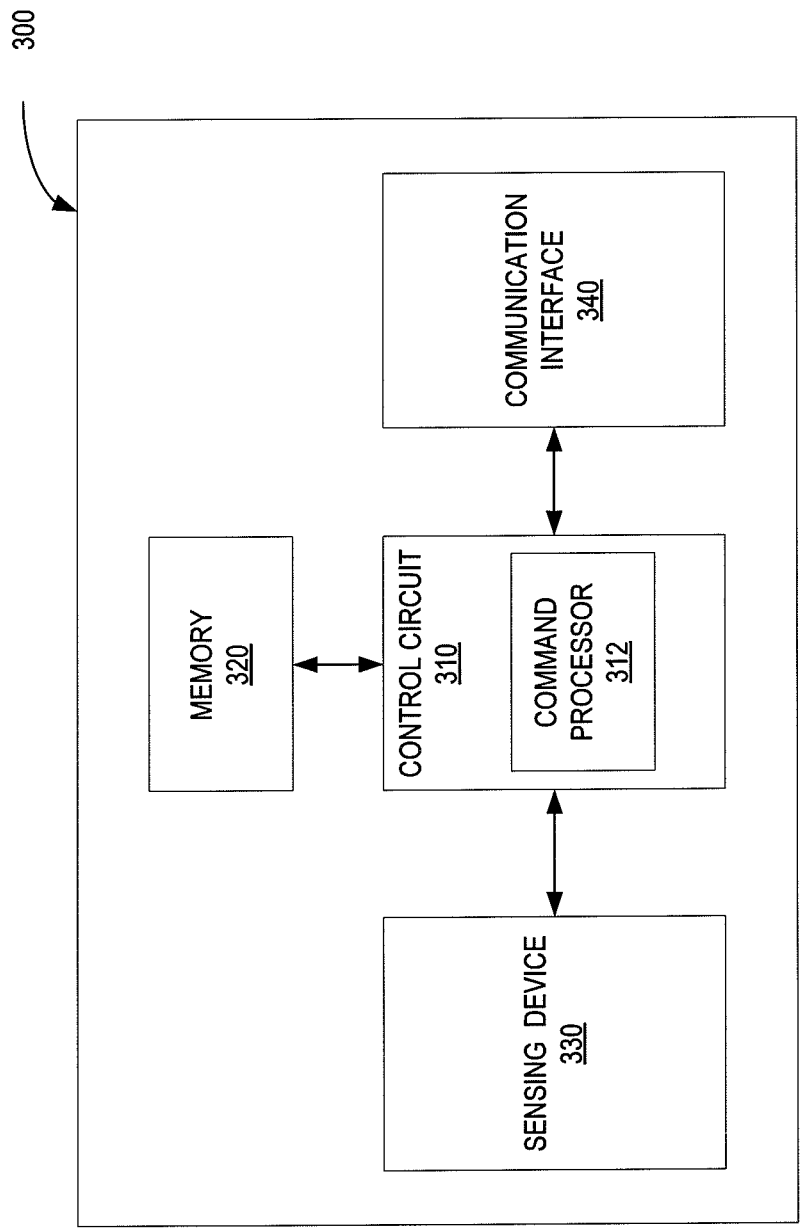
FIG. 15 illustrates the main functional elements of a sensor configured to implement the prioritized controller arbitration method of FIG. 13.

FIG. 15 illustrates the main functional elements of a sensor 300 for performing cooperative control, arbitration, and data synchronization. The sensor 300 comprises a control circuit 310, memory 320, sensing device 330, and communication interface 340. The control circuit 310 controls the operation of the sensor 300 as previously described. The control circuit 310 may be implemented by one or more processors, hardware circuits, firmware, or a combination thereof. The control circuit 310 includes a command processor 312 to process commands received from the controllers 100. The command processor 312 is configured to receive commands from the controllers 100 via the communication interface 340, select one of the controllers 100 as the master controller for each of its state variables, forward commands from subordinate controllers to the master controller via the communication interface 340, and execute commands from the master controller or peer controllers.

Memory 320 stores program instructions and data needed by the control circuit 310 to perform its functions. Memory 320 also stores the current values of its state variables. Memory 320 may, for example, comprise a non-volatile memory device such as electrically erasable programmable read-only memory (EEPROM), flash memory, or magnetoresistive random access memory (MRAM). A volatile memory device, such a random access memory may also be used to store temporary data.

The sensing device 330 comprises any type of transducer that senses a parameter of the controlled process and generates an electrical signal indicative of the current value of the parameter. As one example, the sensing device 330 may comprise a temperature transducer to measure the temperature. In a residential heating system, a temperature transducer can be used to measure the temperature in a room and report the temperature to the controllers 100.

The communication interface 340 provides a connection to a local area network (LAN) and enables the sensor 300 to communicate with the controllers 100 in the control system 10. If the LAN comprises a wireline network, the communication interface 340 may comprise an Ethernet interface. Alternatively, the communication interface 340 may comprise a WiFi interface, BLUETOOTH interface, ZIGBEE interface, or other wireless radio interface to connect to a wireless access point (WAP) in the LAN.

Figure 16:
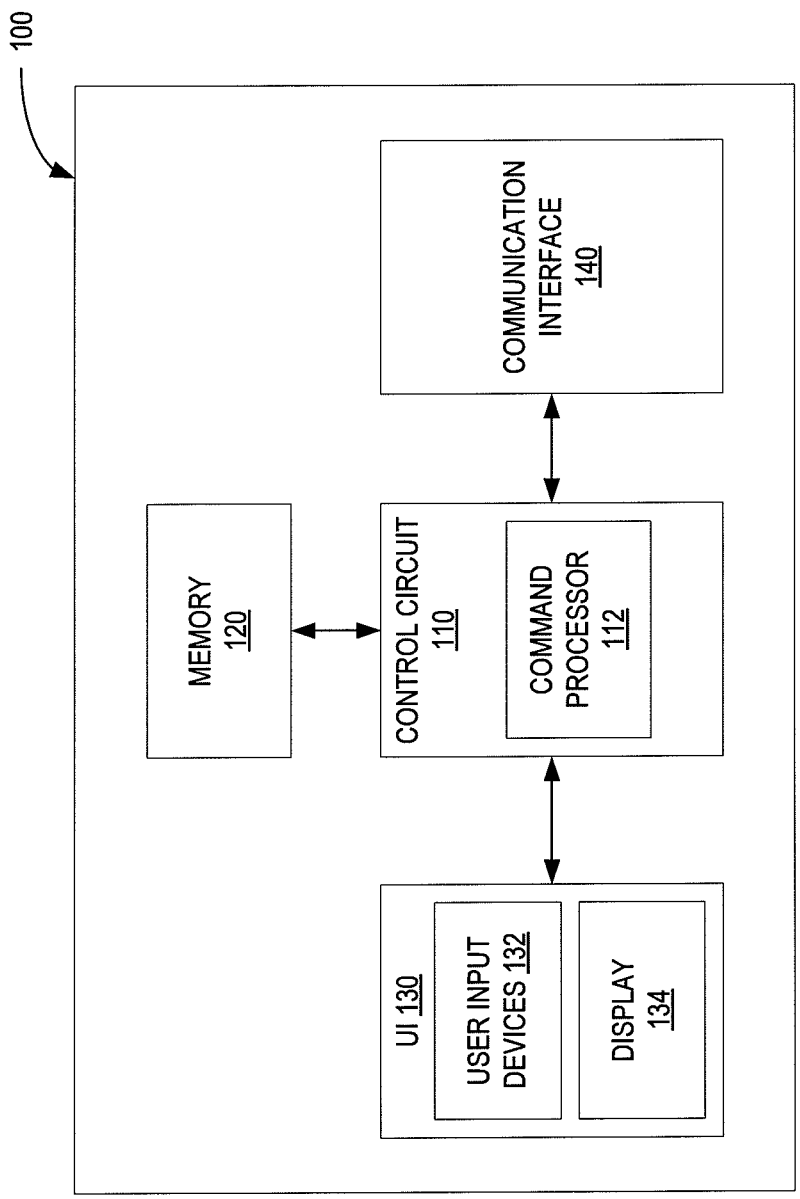
FIG. 16 illustrates an exemplary controller configured to implement the data synchronization methods herein described.

FIG. 16 illustrates an exemplary controller 100 performing cooperative control, arbitration, and data synchronization. Controller 100 comprises a control circuit 110, memory 120, a user interface 130, and a communication interface 140. The control circuit 110 controls the operation of the controller as previously described. The control circuit 110 may be implemented by one or more processors, hardware circuits, firmware, or a combination thereof. The control circuit 110 includes a command processor 112 that is configured to determine the logical groups and corresponding reference devices of associated actuators 200 and sensors 300, read the current values of the state variables from the reference device, and send commands to the actuators 200 and sensors 300 in a logical group 400 to update or refresh the state variables as described above.

Memory 120 stores program instructions and data needed by the control circuit 110 to perform its functions. Memory 120 also stores a table with the logical groups and the corresponding reference devices. For example, the table may include the group identifier, and addresses of the group members including the reference device. Memory 120 may, for example, comprise a non-volatile memory device such an electrically erasable programmable read-only memory (EEPROM), flash memory, or magnetoresistive random access memory (MRAM). A volatile memory device, such a random access memory (RAM), may also be used to store temporary data.

The user interface 130 comprises one or more user input devices 132 and a display 134 to enable a user to interact with the control system 10. The user input devices 132 may include a keypad or touch screen for entering data and commands. The display 134 may comprise a liquid crystal display (LCD) or touch screen display that also functions as a user input device 132.

The communication interface 140 provides a connection to a local area network (LAN) and enables the controller 100 to communicate with the actuators 200 and sensors 300 in the control system 10. If the LAN comprises a wireline network, the communication interface 140 may comprise an Ethernet interface. Alternatively, the communication interface 140 may comprise a WiFi interface, BLUETOOTH interface, ZIGBEE interface, or other wireless radio interface to connect to a wireless access point (WAP) in the LAN.

The arbitration and data synchronization techniques enable the actuators 200 and sensors 300 to dynamically adapt to changes in the control topology. One advantage of this approach is that the type of control, centralized or distributed, is not fixed at the time the system is installed. As new components are added or old components are removed, the control system 10 dynamically responds to these changes by reselecting the arbitration and/or refresh master controllers. The techniques described herein also provide inherent redundancy for both central controllers and distributed controllers. When central controllers are added, the distributed controllers remain available. When the central controller fails or is removed, the control reverts back to the distributed controllers.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by an actuator or sensor of adapting to changes in the control topology of a cooperative control system including a plurality of controllers, the method comprising:

selecting, by the actuator or sensor, one of the controllers as the master controller for one or more state variables of the actuator or sensor;

detecting, by the actuator or sensor, a change in the control topology of the cooperative control system; and reselecting, by the actuator or sensor, a master controller for the one or more state variables responsive to the change in the control topology.

2. The method of claim 1 wherein detecting a change in the control topology comprises detecting an addition of a new controller.

3. The method of claim 2 wherein reselecting a master controller comprises:

comparing a priority level of the new controller with a priority level of the current master controller; and selecting the new controller to be the master controller if the priority level of the new controller is higher than the priority level of the current master controller.

4. The method of claim 3 further comprising maintaining the current master control as master controller if the priority level of the new controller is not higher than the priority level of the current master controller.

5. The method of claim 1 wherein detecting a change in the control topology comprises detecting a loss of a current master controller.

6. The method of claim 5 wherein reselecting a master controller comprises selecting a remaining one of the controllers as a new master controller.

7. The method of claim 6 wherein selecting a remaining one of the controllers as a new master controller comprises:

comparing the relative priority levels of two or more of the remaining controllers; and selecting one of the remaining controllers to be the master controller based on the comparison.

8. The method of claim 1 further comprising:

receiving a command from an originating controller other than the current master controller; and redirecting the command to the master controller.

9. An actuator or sensor in a cooperative control system, the actuator or sensor comprising:

a communication interface for communicating over a network with a plurality of controllers; and a control circuit for adapting to changes in the control topology of the cooperative control system, said control circuit being configured to:

select one of the controllers as a master controller for one or more state variables of the actuator or sensor;

detect a change in the control topology of the cooperative control system; and reselect a master controller for the one or more state variables responsive to the change in the control topology.

10. The actuator or sensor of claim 9 wherein the control circuit is configured to detect an addition of a new controller.

11. The actuator or sensor of claim 10 wherein the control circuit is configured to reselect a master controller by:

comparing a priority level of the new controller with a priority level of the current master controller; and selecting the new controller to be the master controller if the priority level of the new controller is higher than the priority level of the current master controller.

12. The actuator or sensor of claim 11 wherein the control circuit is further configured to maintain the current master control as master controller if the priority level of the new controller is not higher than the priority level of the current master controller.

13. The actuator or sensor of claim 9 wherein the control circuit is configured to detect a loss of a current master controller.

14. The actuator or sensor of claim 13 wherein the control circuit is configured to reselect a remaining one of the controllers as a new master controller.

15. The actuator or sensor of claim 14 wherein the control circuit is configured to reselect a remaining one of the controllers as a new master controller by being configured to:

compare the relative priority levels of two or more of the remaining controllers; and select one of the remaining controllers to be the master controller based on the comparison.

16. The actuator or sensor of claim 9 wherein the control circuit is further configured to:

receive a command from an originating controller other than the current master controller; and redirect the command to the master controller.

* * * * *